(12) United States Patent
Mayer et al.

(10) Patent No.: US 6,238,162 B1
(45) Date of Patent: May 29, 2001

(54) TRANSPORTABLE APPARATUS FOR UNLOADING MATERIAL FROM A DUMP TRUCK

(75) Inventors: Martin G. Mayer, Racine, WI (US); Don T. Matthews, Emory, TX (US)

(73) Assignee: Putz Heister, Inc., Sturtevant, WI (US)

( * ) Notice: Subject to any disclaimer, the term of this patent is extended or adjusted under 35 U.S.C. 154(b) by 0 days.

(21) Appl. No.: 09/522,224

(22) Filed: Mar. 9, 2000

(51) Int. Cl.$^7$ ................. B60P 1/00; B60P 1/43; B60P 1/48
(52) U.S. Cl. ............... 414/346; 414/376; 414/397
(58) Field of Search .................. 414/346, 376, 414/574, 397

(56) References Cited

U.S. PATENT DOCUMENTS

| | | | |
|---|---|---|---|
| 3,895,702 | 7/1975 | Newsom | 198/11 |
| 4,357,129 | * 11/1982 | Luttig | 444/346 |
| 4,624,357 | 11/1986 | Oury et al. | 198/313 |
| 4,669,674 | 6/1987 | Oldengott et al. | 241/101.7 |
| 5,297,914 | 3/1994 | Ash | 414/574 |
| 5,404,993 | 4/1995 | Scarrow | 198/550.2 |
| 5,458,451 | 10/1995 | Bratlie et al. | 414/385 |
| 5,509,723 | 4/1996 | Bratlie | 298/18 |

FOREIGN PATENT DOCUMENTS

| | | | |
|---|---|---|---|
| 816816 | * 4/1981 | (SU) | 414/346 |
| 874539 | * 10/1981 | (SU) | 414/346 |

* cited by examiner

Primary Examiner—Steven A. Bratlie
(74) Attorney, Agent, or Firm—Andrus, Sceales, Starke & Sawall, LLP (57) ABSTRACT

A transportable apparatus for unloading material directly from a dump truck onto a conveyor assembly. The transportable apparatus includes an inclined ramp that is adapted to permit a dump truck to back onto the ramp. A hopper assembly is movably mounted to the rear end of the inclined ramp and is positioned to receive material unloaded from the dump truck. The hopper assembly includes a hopper bin mounted to the back end of the inclined ramp by a pair of support arms. The first end of the each support arm is connected to a drive member such that the hopper bin can be raised and lowered relative to the inclined ramp. A wheel assembly is also mounted to the rear end of the inclined ramp. The wheel assembly is mounted between a pair of support arms. The inner end of each support arm is pivotally connected to the inclined ramp, while the outer end of the each support arm for the wheel assembly is connected to a wheel axle. The raising devices are operable to raise the inclined ramp relative to the wheel assembly for transportation and lower the incline ramp relative to the wheel assembly for receiving the dump truck.

18 Claims, 5 Drawing Sheets

TRANSPORTABLE APPARATUS FOR UNLOADING MATERIAL FROM A DUMP TRUCK

BACKGROUND OF THE INVENTION

The present invention relates to a transportable apparatus for use in unloading material from a dump truck. More specifically, the present invention relates to a transportable apparatus that includes a hopper assembly that collects and guides material onto a conveyor assembly as the material is unloaded from a dump truck.

Vehicle-mounted, extendable concrete conveyor systems, such as shown in U.S. Pat. No. 4,624,357, have been in wide use for some time. Vehicle-mounted conveyor systems of this type have been found to be very useful because the concrete, or other aggregate material, can be transferred to a location at the work site that may be located a considerable distance from the supply of material. The vehicle-mounted conveyor system has proven to be very useful since the entire conveyor system can be quickly and easily moved by simply moving the vehicle on which the conveyor system is mounted. The conveyor system not only can be moved around the work site, but also includes a discharge conveyor assembly having a telescoping boom that can be extended and retracted, rotated about a vertical axis, and elevated to considerable heights. The vehicle-mounted conveyor system identified above can be moved from a working position to a transporting position and the entire vehicle and conveyor system can be transported over highways to travel between various work sites.

The extendable discharge conveyor assembly of the conveyor system includes a moving discharge conveyor belt that is fed by a second, infeed conveyor assembly. One end of the infeed conveyor assembly is positioned to receive a supply of concrete from a ready-mix truck or other type of delivery means. The infeed conveyor assembly transfers the material onto the discharge conveyor belt, which in turn transports the material to the desired point at the work site.

In currently available vehicle-mounted conveyor systems, the infeed conveyor assembly has a fixed length and is mounted to a main turret on the vehicle body. The infeed conveyor assembly is rotatable about the main turret such that the infeed conveyor assembly can be positioned at various locations around the vehicle. In addition, the entire infeed conveyor assembly is typically pivotally mounted to the main turret about a horizontal axis such that the outermost end of the infeed conveyor assembly can be raised and lowered as desired. For example, the entire infeed conveyor assembly can be raised above the vehicle and stored in a transporting position above the vehicle cab. Since the maximum length for the vehicle, including the discharge conveyor assembly and the infeed conveyor assembly in their transporting position, should not exceed 40 feet, the overall, fixed length of the infeed conveyor assembly is typically 40 feet.

The self-propelled, vehicle-mounted conveyor system is often used to transport aggregate materials, such as sand or loose gravel, supplied by a dump truck. Typical dump trucks have a bed that can be lifted upward relative to the vehicle to unload materials from within the bed. A rear tailgate extends across the width of the bed and often times includes a coal chute. The coal chute is substantially more narrow that the rear tailgate and includes a door that can be selectively opened or closed. As the bed of the dump truck is lifted, the material within the bed exits through the coal chute in a contained and controlled stream that can be fed directly onto the infeed conveyor assembly for the vehicle mounted conveyor system described above.

Although many dump trucks include a coal chute, a significant number of the dump trucks currently in use include only a tailgate that opens across the entire width of the dump truck. The width of a conventional dump truck is approximately 102 inches and a dump truck thus unloads material across its full width at a height not more than 30 inches above the ground. The above-described infeed conveyor assembly contained on the vehicle mounted conveyor system can not be used alone to unload this type of dump truck since the change in height of the infeed conveyor over the width of the dump truck exceeds the unloading height for the dump truck. For example, when the infeed conveyor assembly is on an incline of approximately 20°, the change in height of the infeed conveyor assembly is approximately 37 inches over the 102 inch width of the dump truck body. Therefore, if a dump truck backs up directly to the conventional fixed length infeed conveyor assembly, the height of the infeed conveyor assembly will exceed the unloading height for the dump truck along a portion of the width of the dump truck body.

To overcome the unloading problems identified above, the material contained within the bed of the dump truck is stockpiled and a skid-steer loader or other similar type of equipment is used to deposit the aggregate material into an independent hopper positioned above the infeed conveyor assembly. The hopper is required to accumulate the supply of aggregate material as the material is supplied by the skid-steer loader. As can be easily understood in the above description, the use of a skid-steer loader to supply the aggregate material that was previously stockpiled by unloading the entire bed of the dump truck introduces a separate operating step and requires additional personnel to supply the aggregate material to the infeed conveyor assembly of the vehicle mounted conveyor system.

Therefore, it is a primary object of the present invention to provide a transportable apparatus that can be used to directly unload the aggregate material from the bed of a dump truck onto a conveyor assembly, such as the infeed conveyor assembly of a vehicle mounted conveyor system. Further, it is an object of the present invention to provide a transportable apparatus that includes an inclined ramp having a pair of spaced support platforms that receive the wheels of a dump truck as the dump truck is driven onto the inclined ramp. Additionally, it is an object of the present invention to provide a hopper assembly mounted to the rear end of the inclined ramp to receive the aggregate material unloaded from the dump truck and direct the material onto the conveyor assembly. It is a further object of the present invention to provide a wheel assembly on the inclined ramp that is movable between a transport position and a loading position such that the inclined ramp is both stable during the unloading of a dump truck and can be transported by a conventional vehicle.

Additionally, it is an object of the present invention to provide a hopper assembly that includes a hopper bin extending along the entire width of the dump truck bed and having a significantly smaller discharge opening positionable above a conveyor assembly. Further, it is an object of the invention to provide a hopper bin that is movable to numerous positions between an upper, transport position and lower, unloading position.

SUMMARY OF THE INVENTION

The present invention is a transportable apparatus that includes a hopper assembly for directly receiving material unloaded from a dump truck and directing the unloaded material onto a conveyor assembly. The transportable apparatus of the invention includes an inclined ramp that increases in height from a front end to a rear end. The front end of the inclined ramp includes a hitch assembly that can be used to connect the apparatus to a vehicle for transporting the entire apparatus to a desired location.

The inclined ramp includes a pair of spaced support platforms that are positioned to receive the wheels of a dump truck as the dump truck is driven onto the inclined ramp. Each of the support platforms extends to the front end of the inclined ramp and includes a loading ramp that can be raised and lowered. When each of the loading ramps are lowered, the loading ramps contact the ground to provide a convenient ramp for a dump truck to drive onto the associated support platforms. When each of the loading ramps are in the transport position, a loading ramps are positioned away from the hitch assembly to permit the hitch assembly to be attached to a vehicle such as a semi-cab.

A hopper assembly is pivotally mounted to the rear end of the inclined ramp. The hopper assembly includes a hopper bin positioned adjacent to the rear end of the inclined ramp. The hopper bin includes an upper opening that extends along the entire width of the inclined ramp. A plurality of inclined walls extend from the upper opening to and are joined to each other to define a smaller discharge opening positioned beneath the upper opening. The plurality of inclined walls direct the material unloaded by the dump truck from the upper opening to the much smaller discharge opening. In this manner, the hopper bin creates a controlled flow of material that can be deposited on a conveyor assembly as the material is unloaded from the dump truck.

The hopper bin is supported by a pair of supports arms that are each pivotally connected to the inclined ramp. Specifically, pair of drive members are positioned between each of the support arms and the inclined ramp. The drive members of the hopper assembly are operable to selectively raise and lower the hopper bin relative to the stationary inclined ramp. Preferably, the drive members are pneumatic bellows that can be inflated and deflated to raise and lower the hopper bin relative to the inclined ramp. By raising and lowering the hopper bin, the hopper bin can be positioned in a desired location relative to a conveyor assembly.

In addition to the hopper assembly, a wheel assembly is also mounted to the rear end of the inclined ramp. The wheel assembly includes a wheel axle and a plurality of wheels rotatable about the wheel axle. The wheel axle is supported by a pair of wheel support arms that each have an outer end connected to the wheel axle and an inner end pivotally connected to the inclined ramp. A raising device is operatively positioned between the wheel support arms and the inclined ramp. The raising device can be selectively operated to raise and lower the rear end of the inclined ramp relative to the wheels and wheel axle of the wheel assembly. Preferably, the raising device is a pair of pneumatic bellows that can be inflated or deflated to raise or lower the inclined ramp relative to the wheel assembly. The bellows of the raising device can be fully deflated to move the inclined ramp to a ground engaging, unloading position. The bellows of the raising device can be fully inflated to raise the inclined ramp off of the ground such that the transportable apparatus can be moved to any desired location.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE DRAWINGS

Figure 1:
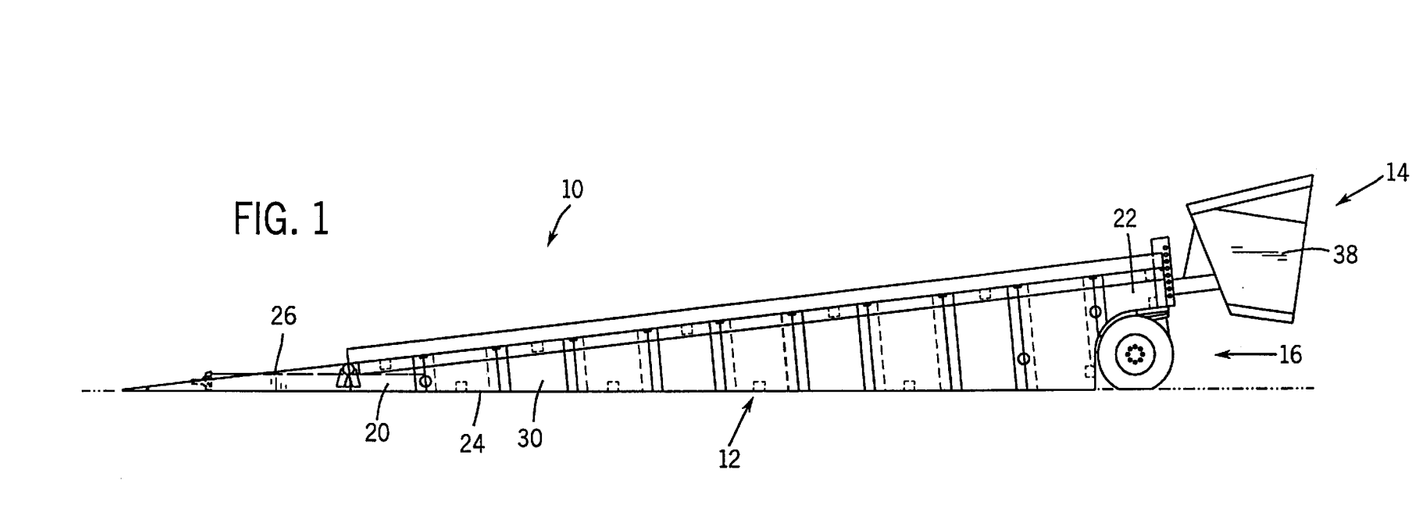
FIG. 1 is a side profile of a transportable apparatus for unloading material from a dump truck of the present invention in its loading position.
Figure 2:
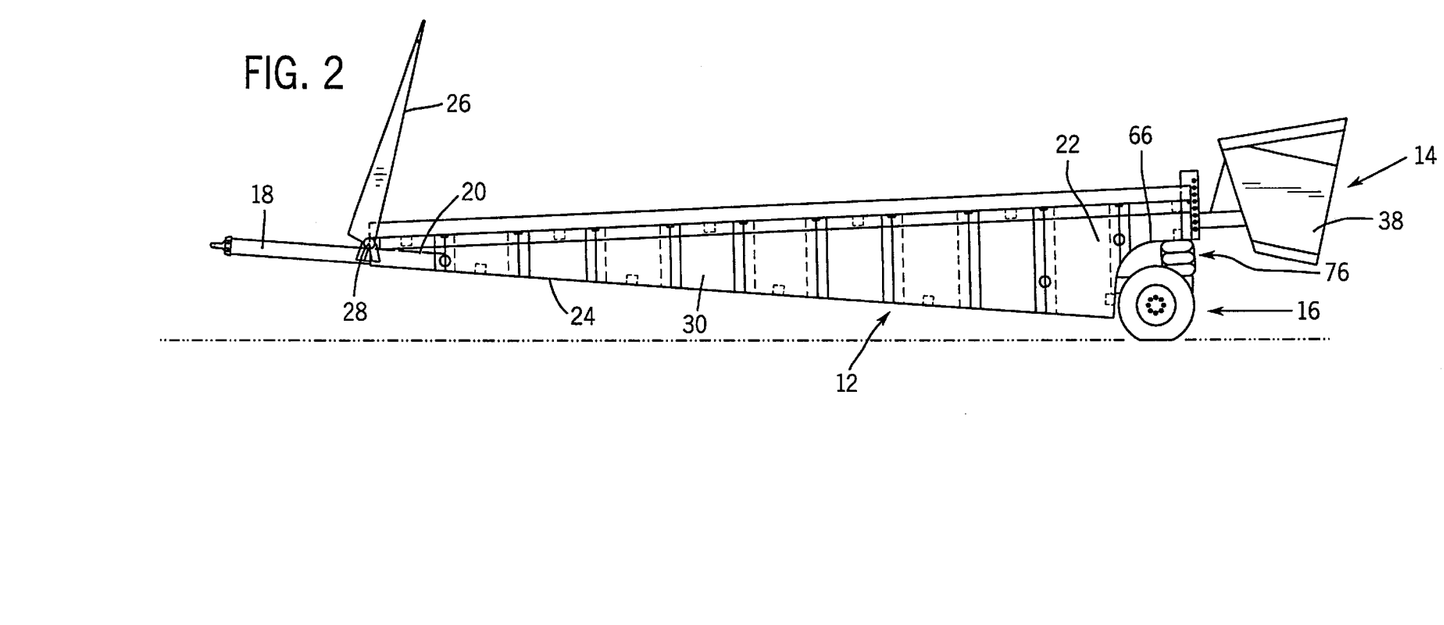
FIG. 2 is a side profile of the apparatus in its transport position.

Referring first to FIGS. 1 and 2, thereshown is a transportable apparatus 10 that can be used to unload material from a dump truck onto a conveyor assembly. The transportable apparatus 10 includes an inclined ramp 12, a hopper assembly 14 and an adjustable wheel assembly 16. The transportable apparatus 10 is shown in the unloading position in FIG. 1 and in a transport position in FIG. 2. When the apparatus 10 is in the unloading position of FIG. 1, a dump truck can be driven onto the apparatus 10 and can discharge its load into the hopper assembly 14. After the dump truck has discharged its load, the apparatus 10 can be attached to a vehicle, such as a semi-cab, by a hitch assembly 18 and towed to a new location. In this manner, the transportable apparatus 10 of the present invention can be positioned at any desired location at a work site in order to allow the unloading of dump trucks. Specifically, the apparatus 10 of the present invention is particularly useful in the unloading of dump trucks that do not include a coal chute in the tailgate and thus must unload their bed through the entire back width of the tailgate.

Figure 3:
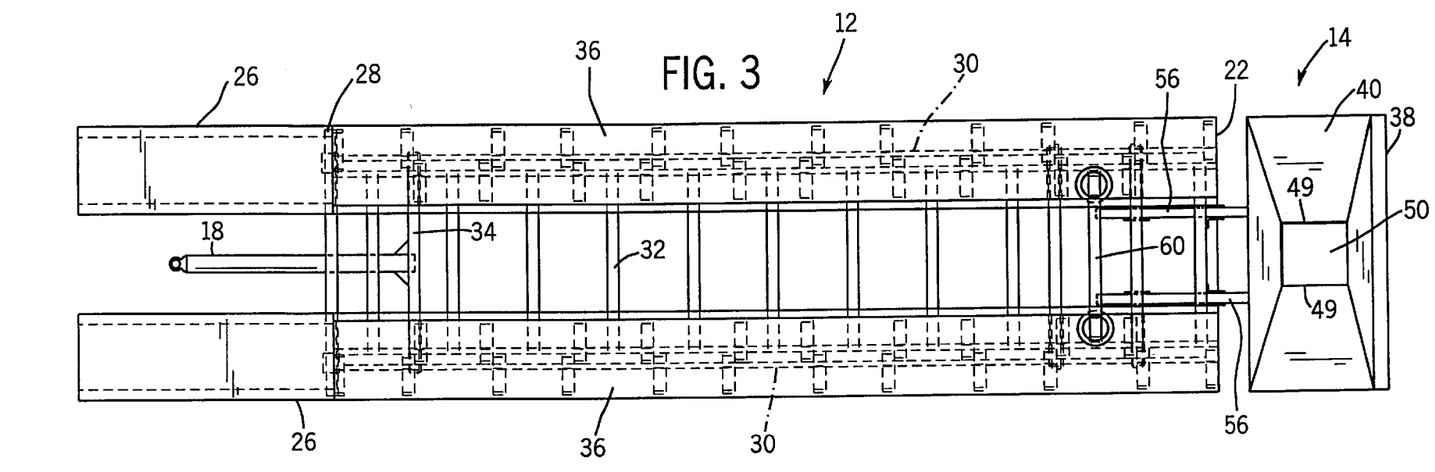
FIG. 3 is a top view of the apparatus of FIG. 1.

Referring now to FIG. 1, the inclined ramp 12 increases in height from a front end 20 to a rear end 22. When the apparatus 10 is in the unloading position of FIG. 1, the bottom edge 24 of the inclined ramp 12 is supported on the ground and a pair of loading ramps 26 are moved from the transport position of FIG. 2 to a ground-engaging, loading position illustrated in FIG. 1. When the loading ramps 26 are in the ground engaging position of FIG. 1, the loading ramps 26 allow a dump truck to back onto the remaining portions of the inclined ramp 12. As can be seen in FIGS. 2 and 3, each of the loading ramps 26 is mounted about a pivot rod 28 such that the loading ramps 26 can be moved between the storage position and a ground engaging position.

As illustrated in FIGS. 1 and 3, the inclined ramp 12 includes a pair of spaced sidewalls 30. The sidewalls 30 are joined to each other by a series of spaced lateral supports 32 that provide the required structural rigidity for the inclined ramp, as can best be seen in FIG. 3. As can be seen in FIG. 3, the hitch assembly 18 includes a lateral support member 34 that extends between the pair of spaced sidewalls 30. The lateral support member 34 supports the entire weight of the inclined ramp 12 when the apparatus 10 is in the transport position of FIG. 2 and connected to a vehicle (not shown).

Figure 5:
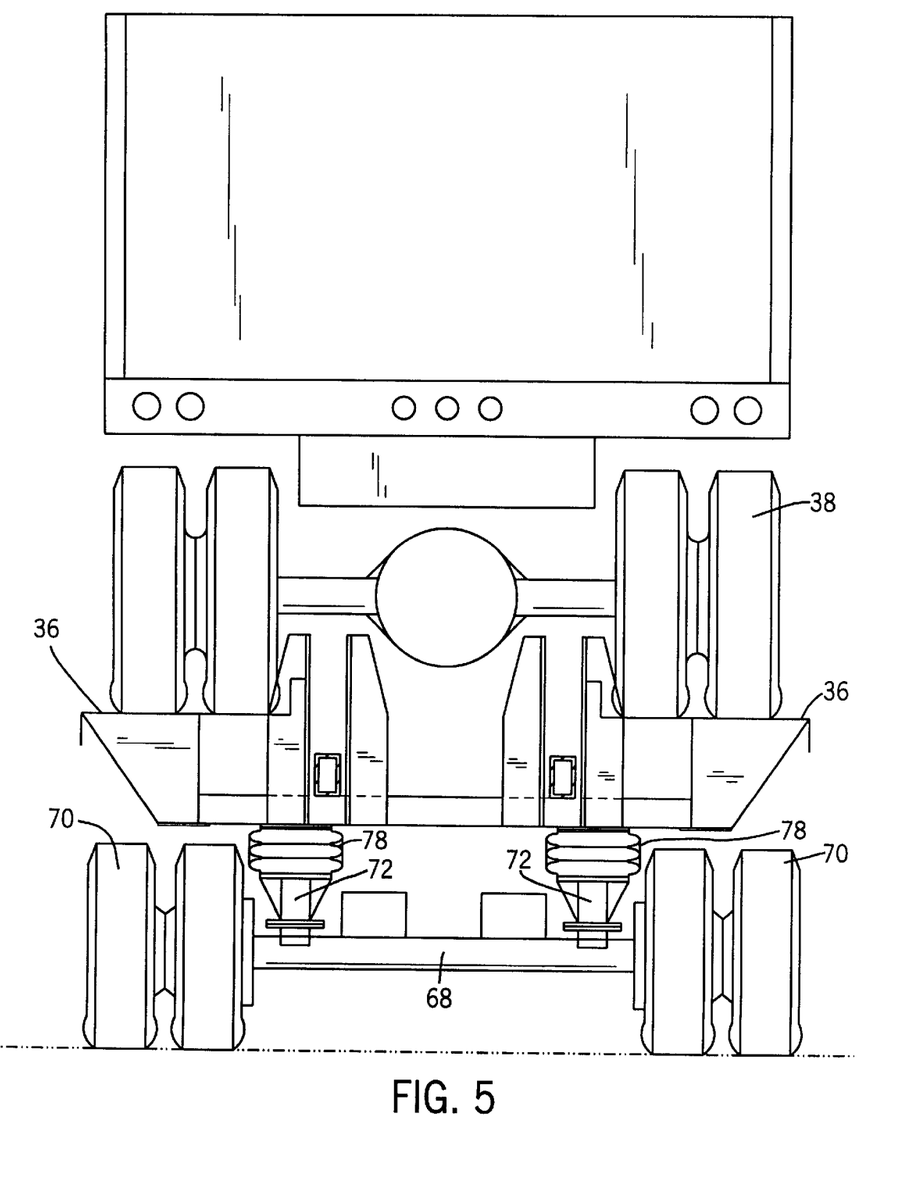
FIG. 5 is a back view illustrating the apparatus when supporting a dump truck.

Referring back to FIG. 3, the inclined ramp 12 includes a pair of spaced support platforms 36 that each extend from the front end 20 to the rear end 22 of the inclined ramp 12. The support platforms 36 are each supported by one of the sidewalls 30 and are spaced from each other at a distance to accommodate the wheels 38 of a conventional dump truck, as is illustrated in FIG. 5. As can be seen in FIGS. 3, the support platforms 36 are each aligned with one of the loading ramps 26 such that the dump truck can travel from the loading ramps 26 to the support platforms 36. In the preferred embodiment of the invention, each of the support platforms 36 and the corresponding loading ramps 26 have a width of approximately 29 inches to accommodate the wheels 38 of the conventional dump truck.

In the preferred embodiment of the invention, the overall length of the apparatus 10 when in the unloading position of FIG. 1 is approximately 40 feet, as measured from the tip of the loading ramp 26 to the end of the hopper assembly 14. When in the unloading position of FIG. 1, the rear end 22 of the inclined ramp 12 is approximately 4 feet above the ground.

Referring now to FIG. 3, the hopper assembly 14 includes a hopper bin 38 positioned adjacent to the rear end 22 of the inclined ramp 12. The hopper bin 38 includes a plurality of inwardly tapered walls 40. The hopper bin 38 extends across the entire width of the inclined ramp 12 and is open in the upward direction to receive discharged materials from a dump truck. In the preferred embodiment of the invention, the width of the inclined ramp is approximately 102 inches, which is also the width of a conventional dump truck.

Figure 4:
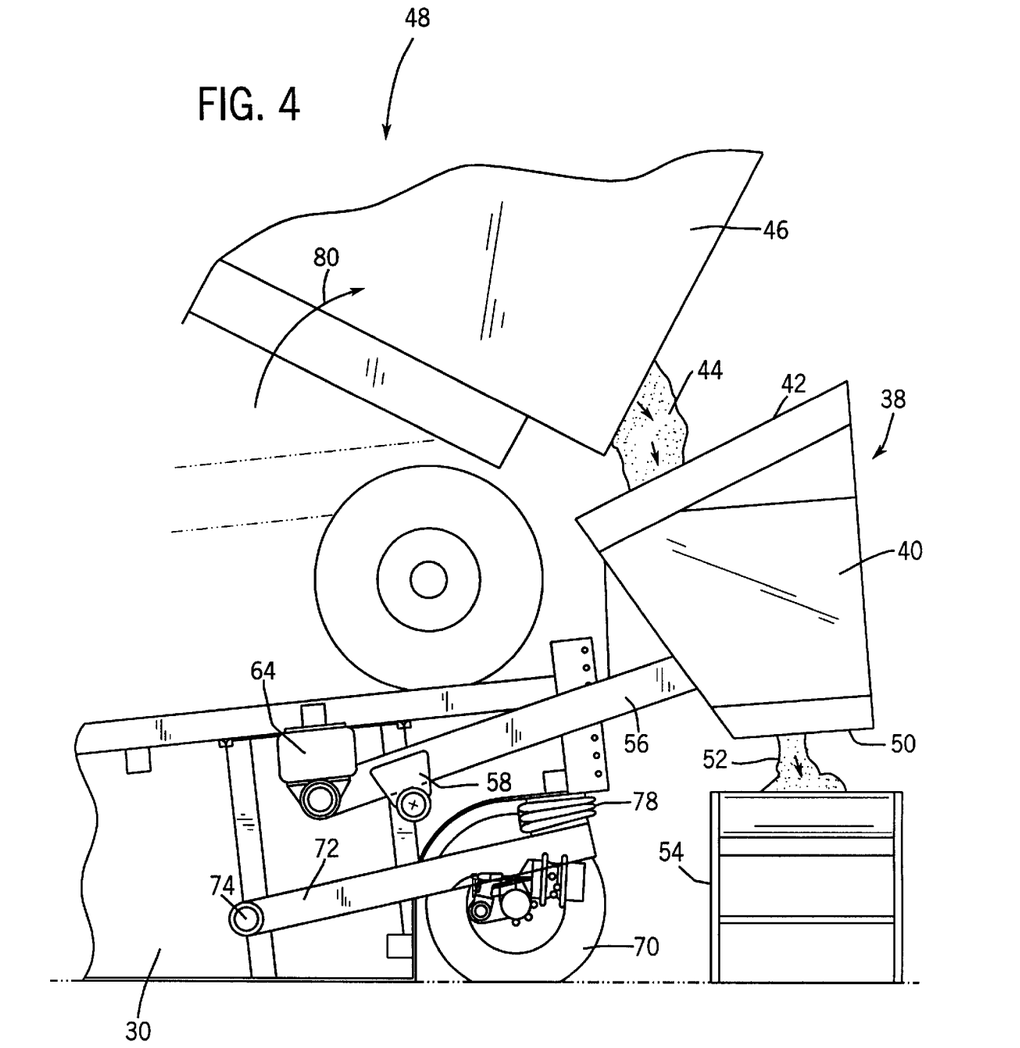
FIG. 4 is a partial side profile view illustrating the apparatus including an integral discharge hopper in use while unloading a dump truck.

The hopper bin 38 defines an upper opening 42 that receives the discharged material 44 from the bed 46 of a conventional dump truck 48, as best illustrated in FIG. 4. As can be seen in FIG. 3, the sloped walls 40 of the hopper bin 38 taper inwardly and each terminate at a bottom edge 49 to define a discharge opening 50 for the hopper bin 38. The discharged opening 50 is significantly smaller in size as compared to the upper opening 42 such that the hopper bin 38 directs the discharged material 44 from the bed 46 of the dump truck 48 to create a more defined and concentrated output product flow 52 that is directed to a conveyor assembly 54. In the preferred embodiment of the invention, the discharge opening 50 is generally square and each side is approximately 24 inches in length. The conveyor assembly 54 can be any type of conventional conveyor assembly that transports the output product flow 52 to a desired location. For example, the conveyor assembly can be part of a vehicle mounted conveyor system, such as shown in U.S. Pat. No. 4,624,357.

Figure 6:
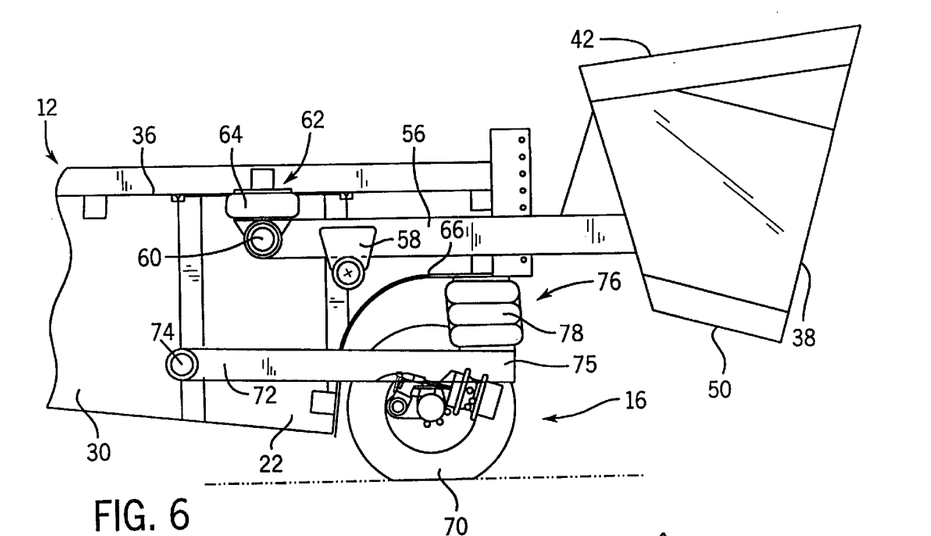
FIG. 6 is a partial side profile view illustrating the wheel assembly in its transport position and the hopper assembly in its fully lowered position.
Figure 7:
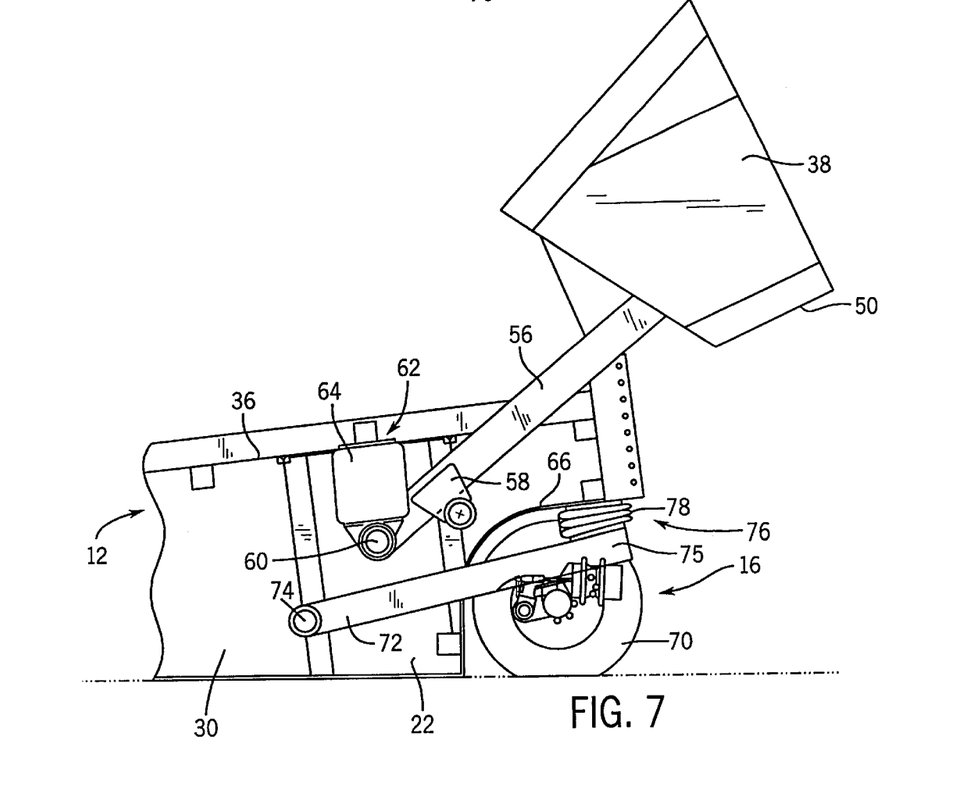
FIG. 7 is a partial side profile view illustrating the wheel assembly in its unloading position and the hopper assembly in its fully raised, upper position.

Referring now to FIGS. 3 and 6, the hopper bin 38 is attached to a pair of support arms 56. The support arms 56 are positioned extend between the pair of spaced support platforms 36 and are each pivotally supported on one of the sidewalls 30 by a pivot bracket 58. The pivot bracket 58 allows each of the support arms 56 to pivot relative to the stationary sidewall 30 such that the attached hopper bin 38 is pivotable between a lower position shown in FIG. 6 and an upper position as shown in FIG. 7. Referring back to FIG. 3, the inner end of each support arm 56 is connected to a lateral crossbar 60 such that the pair of support arms 56 move in unison.

Referring now to FIGS. 6 and 7, each end of the lateral crossbar 60 is coupled to a drive member 62. The drive member 62 is operatively positioned between the lateral crossbar 60 and a portion of the support platform 36 of the inclined ramp 12. The drive member 62 is operable to move the lateral crossbar 60, and thus the inner end of each support arm 56, about the pivot axis defined by the pivot brackets 58 connected to each of the supports arms 56. In the preferred embodiment of the invention, the drive member 62 is a pair of bellows 64 that are inflated and deflated by a supply of pressurized fluid or air. As can be seen in FIG. 6, when the bellows 64 is fully deflated, the hopper bin 38 is in the lower position. As pressure is applied to each of the bellows 64, the bellows expand and the hopper bin 38 is moved to an upper position, as illustrated in FIG. 7. The amount of movement of the hopper bin 38 is controlled by the amount pressure supplied to the bellows 64. In FIG. 4, the bellows 64 are inflated to an intermediate position used to unload the dump truck 48. During transportation, as illustrated in FIG. 6, the pneumatic bellows 64 are fully deflated such that the hopper bin 38 is in the lower position.

Referring now to FIGS. 5–7, each of the sidewalls 30 of the inclined ramp 12 defines a wheel well 66 in which the wheel assembly 16 is positioned. The wheel assembly 16 generally includes a wheel axle 68 that supports a plurality of individual wheels 70, as best illustrated in FIG. 5. The wheel axle 68 is connected to a pair of wheel support arms 72. Each of the wheel support arms 72 is pivotally connected to one of the sidewalls 30 about a pivotal connection 74. The outer end 75 of each wheel support arm 72 is connected to a raising device 76. The raising device 76 is positioned between the outer end 75 of the wheel support arms 72 and the sidewalls 30 of the inclined ramp 12. The raising device 76 can be selectively operated to raise the rear end 22 of the inclined ramp 12 relative to the wheels 70 for transportation, as illustrated in FIG. 6. Additionally, the raising device 76 can be operated to lower the rear end 22 of the inclined ramp 12 relative to the wheels 70 of the wheel assembly 16 to position the transportable apparatus 10 in the unloading position, as illustrated in FIG. 7.

In the preferred embodiment of the invention, the raising device 76 is a pair of bellows 78 that can be selectively inflated and deflated by a source of fluid or air pressure to raise and lower the inclined ramp 12 relative to the wheel assembly 16, as best illustrated in FIGS. 6 and 7.

The operation of the transportable apparatus 10 will now be described. Initially, the raising device 76 of the wheel assembly 16 is fully inflated such that rear end 22 of the inclined ramp 12 is elevated above the ground, as illustrated in FIG. 2. At the same time, each of the loading ramps 26 are moved to the transport position of FIG. 2 such that the hitch assembly 18 can be connected to a vehicle. Once the transportable apparatus 10 is in the transport position as shown in FIG. 2, the apparatus 10 can be moved by the vehicle to a desired location.

Typically, the transportable apparatus 10 is moved to a location adjacent to a conveyor assembly 54, as illustrated in FIG. 4. Once the transportable apparatus 10 is positioned adjacent to the conveyor assembly 54, the hitch 18 is disconnected from the vehicle and the front end 20 of the inclined ramp is lowered into contact with the ground. Once in contact with the ground, each of the loading ramps 26 are moved to their ground-engaging, unloading position, as illustrated in FIG. 1.

After the loading ramps 26 are in position, the raising device 76 is deflated to lower the rear end 22 of the inclined ramp 12 relative to the wheels 70. The raising device 76, and specifically the pair of bellows 78, are deflated until the bottom edge 24 of the inclined ramp 12 contacts the ground, as illustrated in FIG. 1.

Once the inclined ramp 12 is supported on the ground, the drive member 62 of the hopper assembly 14 is selectively operated to raise or lower the hopper bin 38 relative to the conveyor assembly 54, as illustrated in FIG. 4. Specifically, the pair of bellows 64 are inflated or deflated to correctly raise or lower hopper bin 38 relative to the conveyor assembly 54.

Once the hopper bin 38 is in the desired positioned, a dump truck 48 can be driven onto the inclined ramp 12. Specifically, the dump truck is driven onto the spaced support platforms 36 formed on the inclined ramp 12.

Once the dump truck 48 has backed completely onto the inclined ramp 12 and is near the rear end 22 of the inclined ramp 12, the bed 46 of the dump truck 48 is lifted, as illustrated by arrow 80. As the bed 46 is lifted, material is discharged from the bed across the entire width of the dump truck bed 46. The discharged material is received within the upper opening 42 of the hopper bin 38. The tapered, inclined walls 40 of the hopper bin, as illustrated in FIG. 3, direct the flow of material to the discharge opening 50. The material from the bed 46 of the dump truck 48 is accumulated within the hopper bin 38 and discharged onto the conveyor assembly 54 through the discharge opening 50. In this manner, the dump truck 48 can unload material across the entire width of the bed such that the dump truck 48 not having a coal chute can be unloaded onto the conveyor assembly 54.

After the unloading of numerous dump trucks has been completed, the raising device 76 of the wheel assembly 16 can again be inflated to raise the inclined ramp 12 relative to the wheels 70. Once the inclined ramp 12 has been raised, the hitch assembly 18 can be connected to a vehicle and the entire apparatus 10 moved to a new location.

Various alternatives and embodiments are contemplated as being within the scope of the following claims particularly pointing out and distinctly claiming the subject matter regarded as the invention.

What is claimed is:

1. A transportable apparatus for unloading materials from a dump truck and directing the material onto a conveyor assembly, the apparatus comprising:

an inclined ramp adapted to receive the dump truck driving thereon, the height of the inclined ramp increasing from a front end to a rear end; and a hopper assembly mounted to the rear end of the inclined ramp, the hopper assembly including a hopper bin extending past the rear end of the ramp to receive the material unloaded from the dump truck and simultaneously direct the material from a discharge opening of the hopper bin onto the conveyor assembly, wherein the hopper bin is pivotally mounted to the inclined ramp by a pair of support arms each connected to the hopper bin at an outer end and connected to a drive member at an inner end, wherein the drive member is operable to raise and lower the hopper bin relative to the inclined ramp between an upper position and a lower position along an arc defined by the pivoting movement of the support arms, wherein the distance between the discharge opening of the hopper bin and the rear end of the ramp varies as the hopper bin is moved along the arc between the upper position and the lower position.

2. The apparatus of claim 1 further comprising a wheel assembly mounted to the inclined ramp near the rear end, the wheel assembly enabling transportation of the apparatus.

3. The apparatus of claim 2 further comprising a raising device for selectively raising the inclined ramp relative to the wheel assembly for transportation and lowering the inclined ramp relative to the wheel assembly for receiving the dump truck.

4. The apparatus of claim 3 wherein the wheel assembly is pivotally mounted to the inclined ramp by a pair of wheel support arms, the raising device being operatively positioned between wheel support arms and the inclined ramp.

5. The apparatus of claim 4 wherein the raising device is a pair of inflatable bellows.

6. The apparatus of claim 2 further comprising a hitch member attached to the inclined ramp, the hitch member enabling connection of the inclined ramp to a front end of the vehicle.

7. The apparatus of claim 1 wherein each of the drive members is an inflatable bellows positioned between the inner end of the support arm and the inclined ramp.

8. The apparatus of claim 1 wherein the inclined ramp includes a pair of support platforms spaced to receive the wheels of the dump truck driven onto the inclined ramp, each of the support platforms extending from the front end of the inclined ramp to the rear end of the inclined ramp.

9. The apparatus of claim 8 wherein each of the support platforms includes a loading ramp pivotable between a loading position and a ground-engaging transport position.

10. The apparatus of claim 1 wherein the hopper bin includes an upper opening having a width substantially equal to the width of the inclined ramp, the hopper bin tapering from the upper opening to the discharge opening through which material in the hopper bin is discharged.

11. A transportable apparatus for unloading material from a dump truck and directing the material onto a conveyor assembly, the apparatus comprising:

an inclined ramp adapted to receive the dump truck driving thereon, the height of the inclined ramp increasing from a front end to a rear end;

a hopper assembly mounted to the rear end of the inclined ramp, the hopper assembly including a hopper bin positioned adjacent to the rear end of the inclined ramp and pivotally mounted to the inclined ramp by a pair of support arms connected to the hopper bin at an outer end and connected to a drive member at an inner end, the hopper bin being configured to receive the material unloaded from the dump truck and simultaneously direct the material onto the conveyor apparatus;

wherein the drive member is operable to raise and lower the hopper bin relative to the inclined ramp between an upper position and a lower position along an arc defined by the pivoting movement of the support arms, wherein the distance between the discharge opening of the hopper bin and the rear end of the ramp varies as the hopper bin is moved along the arc between the upper position and the lower position, a wheel assembly mounted to the inclined ramp near the rear end of the inclined ramp; and a raising device positioned between the wheel assembly and the inclined ramp, the raising device being operable to selectively raise the inclined ramp relative to the wheel assembly for transportation and selectively lower the inclined ramp relative to the wheel assembly to permit the dump truck to drive onto the inclined ramp.

12. The apparatus of claim 11 wherein the wheel assembly is pivotally mounted to the inclined ramp by a pair of wheel support arms, the raising device being operatively positioned between each wheel support arm and the inclined ramp.

13. The apparatus of claim 11 wherein the raising device is a pair of inflatable bellows.

14. The apparatus of claim 11 further comprising a hitch member attached to the inclined ramp, the hitch member enabling connection of the inclined ramp to a front end of the vehicle.

15. The apparatus of claim 11 wherein the drive member is a pair of inflatable bellows positioned between the inner first end of the support arm and the inclined ramp.

16. The apparatus of claim 11 wherein the inclined ramp includes a pair of support platforms spaced to receive the wheels of the dump truck driven onto the inclined ramp, each of the support platforms extending from the front end of the inclined ramp to the rear end of the inclined ramp.

17. The apparatus of claim 16 wherein each of the support platforms includes a loading ramp pivotable between a loading position and a ground-engaging transport position.

18. The apparatus of claim 11 wherein the hopper bin includes an upper opening having a width substantially equal to the width of the inclined ramp, the hopper bin tapering from the upper opening to the discharge opening through which material in the hopper bin is discharged.

* * * * *

UNITED STATES PATENT AND TRADEMARK OFFICE
CERTIFICATE OF CORRECTION

PATENT NO. : 6,238,162 B1
DATED : May 29, 2001
INVENTOR(S) : Mayer et al.

It is certified that error appears in the above-identified patent and that said Letters Patent is hereby corrected as shown below:

Title page,
Item [73], Assignee: delete "Putz Heister, Inc." and substitute therefor -- Putzmeister, Inc. --

Signed and Sealed this

Twenty-sixth Day of February, 2002

Attest:

JAMES E. ROGAN
Attesting Officer
Director of the United States Patent and Trademark Office